United States Patent
Morrow et al.

(10) Patent No.: US 7,181,699 B2
(45) Date of Patent: Feb. 20, 2007

(54) DYNAMIC RESIZING OF DIALOGS

(75) Inventors: Catherine Rose Morrow, Seattle, WA (US); Ronald Stephen Giesen, Redmond, WA (US); Steven Adam Breinberg, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 09/880,288

(22) Filed: Jun. 13, 2001

(65) Prior Publication Data
US 2002/0191027 A1 Dec. 19, 2002

(51) Int. Cl.
*G06F 17/00* (2006.01)
(52) U.S. Cl. .................. 715/809; 715/800; 715/799; 715/798; 715/810; 715/808
(58) Field of Classification Search ........ 345/798–801, 345/781, 784, 808–813
See application file for complete search history.

(56) References Cited

U.S. PATENT DOCUMENTS

| | | | | |
|---|---|---|---|---|
| 5,513,342 A * | 4/1996 | Leong et al. | ........... | 715/798 |
| 5,577,189 A * | 11/1996 | Gay et al. | ........... | 345/800 |
| 5,682,487 A * | 10/1997 | Thomson | ........... | 345/800 |
| 5,684,969 A * | 11/1997 | Ishida | ........... | 345/800 |
| 5,815,151 A * | 9/1998 | Argiolas | ........... | 345/800 |
| 5,886,694 A | 3/1999 | Breinberg et al. | ........... | 345/340 |
| 6,335,743 B1 * | 1/2002 | Owings | ........... | 345/801 |
| 6,983,424 B1 * | 1/2006 | Dutta | ........... | 715/800 |
| 2001/0047626 A1 * | 12/2001 | Ohkado | ........... | 49/506 |

OTHER PUBLICATIONS

Microsoft Power Point 2000 Step by Step, pp. 8-10, 23-38, 136-142, 159-160, 182-183, 200-201 and 288-290.
*User-Oriented Color Interface Design: Direct Manipulation of Color in Context;* Penny F. Bauersfeld and Jodi L. Slater, *Human Factors in Computing Systems Conference Proceedings on Reaching Through Technology;* 1991; pp. 417-418.
An Introduction to MS-Windows Software Development (Abstract); Linda R. Jacobson; *Conference Companion on Human Factors in Computing Systems;* 1995; pp. 389-390.

* cited by examiner

*Primary Examiner*—Kristine Kincaid
*Assistant Examiner*—Peng Ke
(74) *Attorney, Agent, or Firm*—Merchant & Gould

(57) ABSTRACT

A method and system is provided for dynamically resizing dialogs of a computer software application while the application is running. Dialog windows may be resized by user action, such as by hooking on to one side or to a corner of the dialog window and dragging the side or corner in or out to expand or contract the dialog window. In response to the user's action, the operating system of the user's computer notifies a dialog window manager that the dialog window is being resized. An autolayout module lays out the dialog window to its new size, placing all controls contained therein in their proper locations and with their proper dimensions according to the rules associated with the dialog window.

14 Claims, 4 Drawing Sheets

DYNAMIC RESIZING OF DIALOGS

FIELD OF THE INVENTION

The present invention relates to software user interfaces and, more particularly, the present invention relates to dynamic resizing of dialog windows of a computer software application.

BACKGROUND OF THE INVENTION

Computer programs that operate in a windowing environment commonly use dialog windows to present information and receive input from a user. One example of a popular windowing environment is the Windows® 2000 operating system manufactured by Microsoft Corporation of Redmond, Wash. Software applications such as word processing applications also use dialog windows to present information and receive input from a user. An example of a popular word processing software application is WORD manufactured by Microsoft Corporation of Redmond, Wash. Typical dialog windows contain one or more controls. Examples of these controls are push buttons, radio buttons, check boxes and list boxes. A list box, for example, may be placed in a File Open dialog window, and the list box may contain a listing of files or documents available to the user for opening. Static controls display organized information, but do not receive user input. A label box control is one example of a static control.

During the creation of a dialog window, the position and dimensions of each control within the window are set. The coordinates and dimensions may be specified either in pixels or in dialog units. The value of a dialog unit is mainly dependent on the font used in the dialog. To the extent that the default dialog font differs between operating systems, a dialog unit may be indirectly dependent on the operating system. A common definition of a dialog unit (DLU) is a unit of horizontal or vertical distance within a dialog box. A horizontal DLU is the average width of the current dialog box font divided by four (4). A vertical DLU is the average height of the current dialog-box font divided by eight (8). Once a dialog window is created, a change to the dialog window as a whole may trigger the need to recalculate the coordinates and/or dimensions of each control within the dialog. When the control coordinates and dimensions are specified prior to execution of the program and there is no code to alter the control coordinates and dimensions throughout the run-time life of the dialog, the layout of the dialog window does not change even if the size of the dialog window changes.

Mechanisms have been developed that allow a program developer to specify the relative positions of the controls within the dialog window without specifying precise coordinates or dimensions of each control. At the time the dialog window is displayed (during the execution of the program to which the dialog belongs), these mechanisms automatically calculate the proper coordinates and dimensions of each control and then appropriately position and size the controls based on those coordinates and dimensions.

Such mechanisms allow for a way to ensure the efficient sizing and layout of the controls contained within a dialog window at the development stage of the software application to which the dialog window belongs. The sizes and layout of these controls are acted on at run time, as the dialog window is created on the user's computer. However, such systems do not allow for the dynamic resizing and repositioning of the controls within a dialog window in response to a user action to increase or decrease the size of the dialog window during use of the software application to which the dialog window belongs.

It is with respect to these considerations and others that the present invention has been made.

SUMMARY OF THE INVENTION

In accordance with the present invention, the above and other problems are solved by a method and system for dynamically resizing dialogs of a computer software application while the application and the dialog are running. Dialog windows may be resized by user action, such as by hooking on to one side or to a corner of the dialog window and dragging the side or corner in or out to expand or contract the dialog window. In response to the user's action, the operating system of the user's computer notifies the dialog window manager of the dialog that the dialog window is being resized. The dialog window manager then calls into an autolayout module which lays out all of the controls contained within the dialog window to their new proper sizes and positions, as determined by the rules of layout associated with the dialog window.

More particularly described, a method of resizing a graphical user interface, such as a dialog window of a computer software application, is provided. The graphical user interface contains at least one graphical user interface element, such as one or more controls disposed on the user interface. The size of the graphical user interface is altered dynamically by user action to a selected size while the computer software application is running. A graphical user interface control module is notified that the graphical user interface is being resized to the selected size. The graphical user interface calls into the autolayout mechanism that determines the positions and sizes of all of the graphical user interface elements contained within the graphical user interface. In that process, each graphical user interface element is notified by a callback that tells it to reposition and resize itself on the graphical user interface. The graphical user interface elements are then repositioned and resized on the graphical user interface, and the graphical user interface is displayed.

The graphical user interface element is positioned on the graphical user interface after the graphical user interface has been resized according to a set of predefined rules established by the developer of the graphical user interface for positioning of elements. Displaying the graphical user interface may include constructing a bitmap of the graphical user interface and the elements contained within it, each sized and positioned according to the set of rules defined for this graphical user interface.

These methods may be implemented as a computer process, a computing system or as an article of manufacture such as a computer program product or computer readable media. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

In accordance with an exemplary embodiment of the present invention, a method and a system are provided for dynamically resizing dialogs while running a software application to which the dialogs belong. A user of the software application may expand or contract the size of a dialog window by hooking on to one side or to a corner of the dialog window and dragging the side or corner in or out to expand or contract the dialog window as desired. In response to the user's action, the operating system of the user's computer notifies a dialog window manager that the dialog window is being resized.

The dialog window manager calls an autolayout module that in turn lays out each of the controls contained within the dialog window to their proper sizes and positions according to rules associated with the dialog window. That is, if the rules associated with the dialog window require that a "cancel" button be placed in the lower right-hand corner of the dialog window, the autolayout module will maintain the "cancel" button in the lower right-hand corner of the newly resized dialog.

Figure 1:
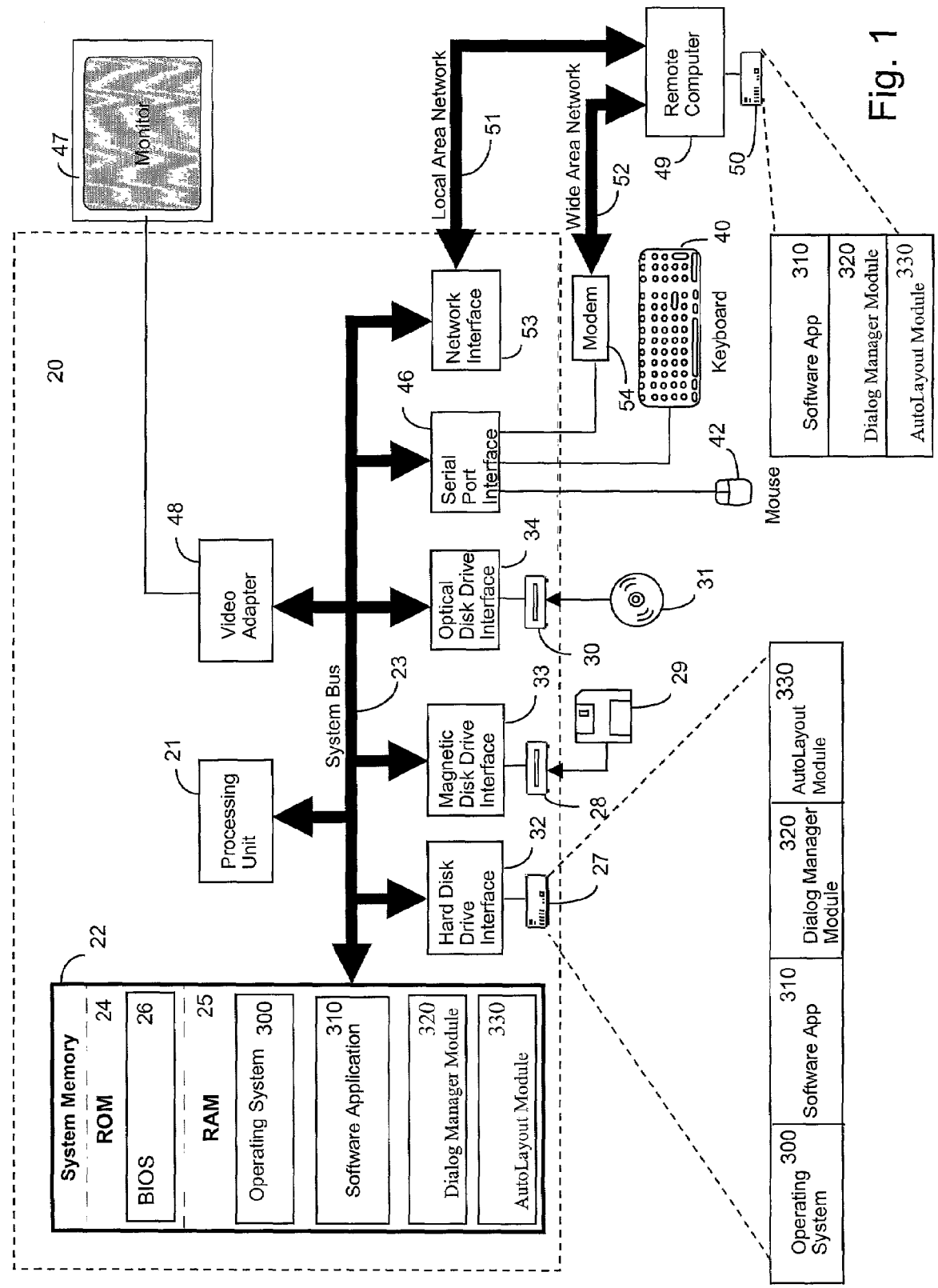
FIG. 1 illustrates a computer system that provides an operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 300, a software application 310, a dialog manager module 320 and an autolayout module 330. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Computing device, such as personal computer 20, typically includes at least some form of computer readable media. Computer readable media can be any available media that can be accessed by personal computer 20. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 2:
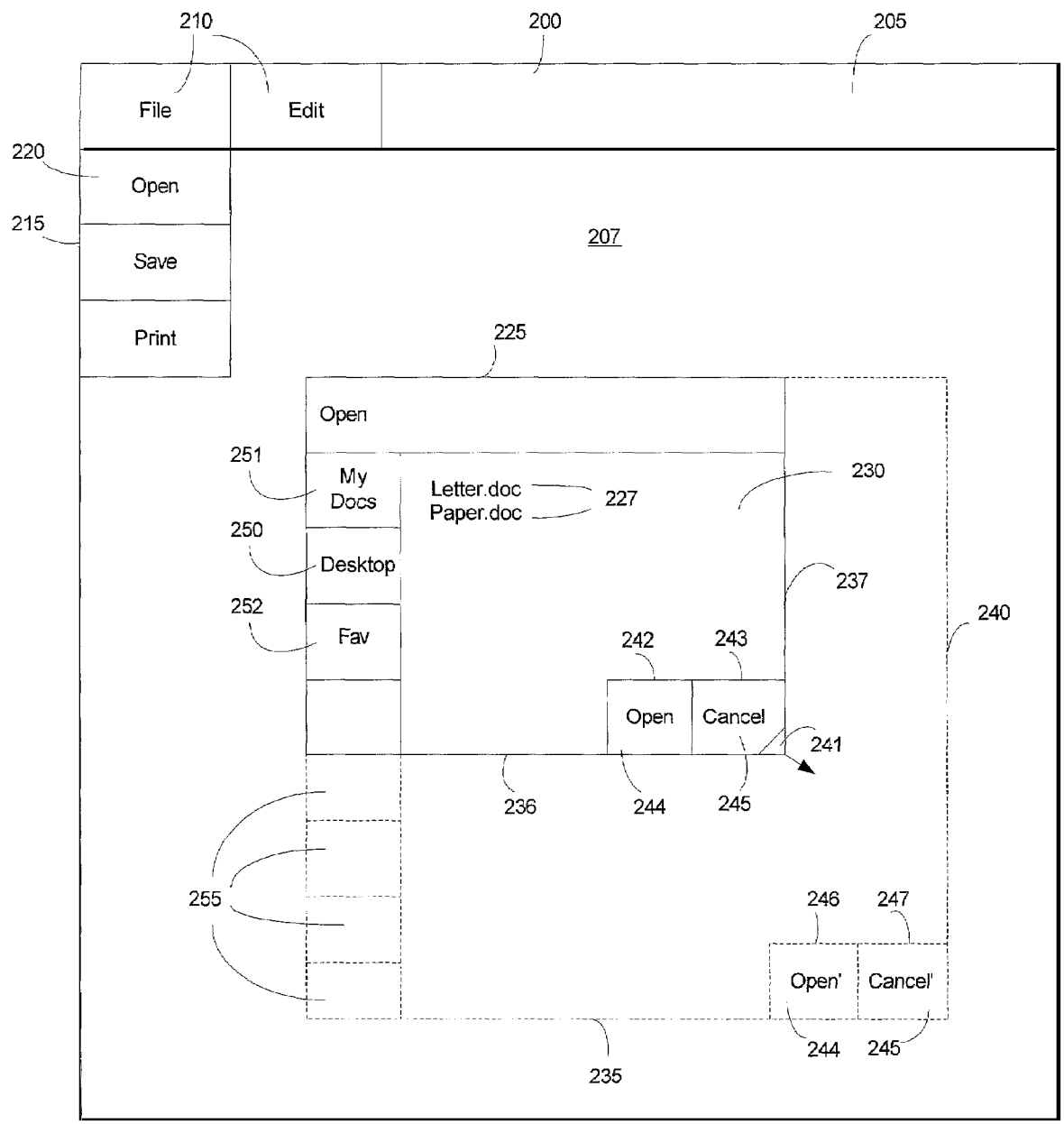
FIG. 2 illustrates an exemplary screen display of a computer generated user interface window showing the functionality of the present invention.

FIG. 2 illustrates an exemplary screen display of a computer generated user interface window 200 showing the functionality of the present invention. According to an exemplary embodiment, a dialog window 225 may be dynamically resized to an expanded or contracted configuration while maintaining a placement and orientation of the controls disposed within the dialog window 225 according to the rules for their orientation set out by the developer of the program to which the dialog window 225 belongs. As shown in FIG. 2, an exemplary window 200 is provided having a text entry area 207, a main toolbar 205 and command buttons 210. Under the File command button 210, a drop-down menu 215 is shown having subcommands including the Open button 220. In accordance with an exemplary embodiment of the present invention, selection of a control such as the Open button 220 causes a dialog window 225 to open as illustrated in FIG. 2. An exemplary software application that provides an application window 200, as illustrated in FIG. 2, is WORD manufactured by Microsoft Corporation of Redmond, Wash. The dialog window 225 provides the user of the software application 310 a graphical user interface for the opening of documents listed in the dialog window 225.

The exemplary dialog window 225 includes a file list box control 230 and command buttons 244 (the Open button) and 245 (the Cancel button). The exemplary dialog window 225 may also contain a number of other controls, including the My Documents control 251, the Desktop control 250 and the Favorites control 252. As should be understood by those skilled in the art, the dialog window illustrated in FIG. 2 is exemplary in nature only and is not meant as restrictive of the layout of a dialog window according to an exemplary embodiment of the present invention.

As illustrated in FIG. 2, in accordance with an exemplary embodiment of the present invention, the user of the software application 310 may expand the dialog window 225 out to the size illustrated by the dotted lines 235 and 240. That is, the side 237 of the dialog window 225 expands out to dotted line 240 and the side 236 of the dialog window 225 expands down to dotted line 235. As should be understood, the dialog window may be expanded or contracted to a variety of different sizes and shapes by pulling any side of the dialog box outward or by pushing a side of the dialog window inward. Alternatively, a resizing tab 241 may be provided to allow the user to click on the resizing tab 241 to drag the dialog window 225 outward or inward to expand or contract the dialog window, as desired. It should be understood that the dialog window 225 may be resized through other means, including keyboard entries directed to the changing dimension of the dialog window.

Once the dialog window 225 is expanded, as illustrated in FIG. 2, the autolayout functionality of the present invention automatically repositions the controls disposed within the dialog window 225 so that the post-resizing configuration of controls such as the Open and Cancel buttons 244, 245 remain in the same or similar configuration as they were in the pre-resized dialog window 225. The post-resized dialog window 225 contains the Open and Cancel buttons 244, 245, but those buttons have moved from their original positions 242, 243 to the new positions 246, 247. However, the Open and Cancel buttons 244, 245 are maintained in the same relative position as they were prior to resizing the dialog window 225. That is, the Open and Cancel buttons 244, 245 have been placed by the autolayout functionality in the lower right-hand corner of the resized dialog window 225. In addition, on the left-hand side of the dialog window 225, the autolayout functionality of the present invention makes room for additional controls 255, as illustrated in FIG. 2.

It may be advantageous or desirable to change the relative positions of controls disposed within the dialog window 225 after the dialog window has been resized. If the pre-resized dialog window contains the Open and Cancel buttons 244, 245 in the configuration illustrated in FIG. 2, but it is more advantageous or desirable to reposition those controls in a different orientation relative to each other or in a different location after the dialog window has been resized, that repositioning may be done if it follows the rules set up by the developer of the dialog window. For example, the rules may allow for positioning the Open and Cancel buttons in an over-under configuration as opposed to side-by-side, illustrated in FIG. 2, if the dialog window is changed to a smaller size.

The file list box 230 is expanded which allows the file list box 230 to show the user more files than was possible in the original size of the dialog window 225. It should be understood that the resizing process is dynamic. That is, as the user drags the dialog window 225 from the first size out to the second size, the number of items listed in the list box 230 will also expand. For example, if only five items were visible in the list box 230 prior to resizing, the number of visible items in the list box 230 will have expanded along with the expansion of the dialog window 225 to show the user more items contained in the list box 230. If reading from left-to-right some information in the list box is truncated at the side 237, that information may be shown after the list box is expanded.

Figure 3:
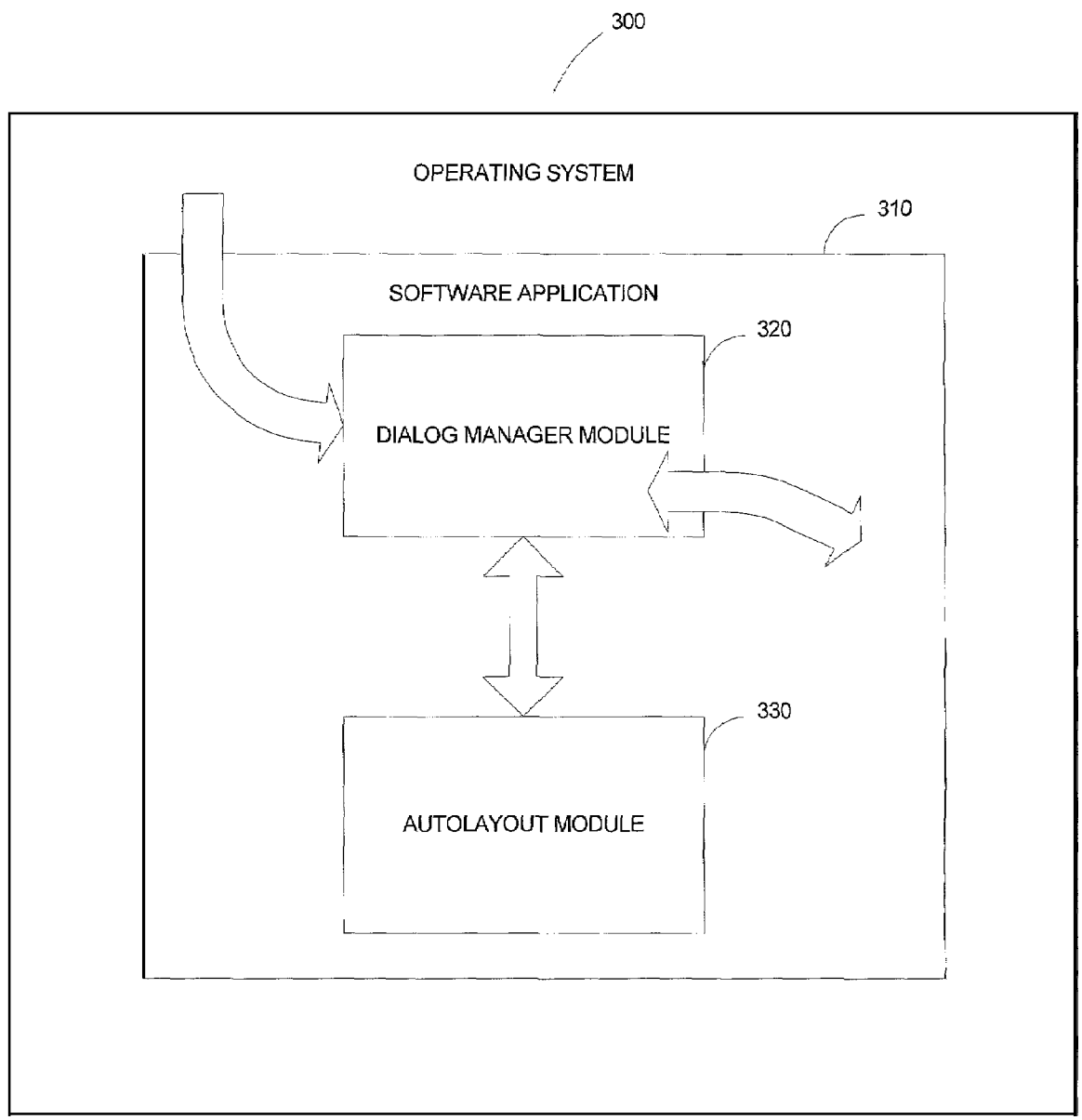
FIG. 3 illustrates interaction between an exemplary operating system, an exemplary software application, a dialog manager module and an autolayout module of the present invention.

FIG. 3 illustrates interaction between an exemplary operating system 300, and exemplary software application 310, a dialog manager module 320 and an autolayout module 330 of the present invention. As described above with reference to FIGS. 2 and 3, when the user of a software application 310, such as a word processing application, selects functionality of that software application for which the software application provides a dialog window, the user may dynamically resize the dialog window 225. When the user resizes the dialog 225, the operating system 300 detects the actions of the user and sends the dialog manager 320 a message that the dialog window 225 is being resized. The mechanisms for the operating system 300 detecting actions from the user at the user's computer 20 are well known to those skilled in the art.

The dialog manager module 320 is a program module containing computer executable instructions for managing the display of the dialog window 225 on the user's computer 20 in connection with the software application 310. The dialog manager module may be a program module resident in the software application 310, or as should be understood by those skilled in the art, the dialog manager module may be a dynamic-link library (DLL) that is a set of computer executable routines that may be called by a number of software applications 310 for execution of its functionality.

After the dialog manager module 320 is notified by the operating system 300 that the dialog window is being resized, the dialog manager module 320 calls the autolayout module 330. The autolayout module 330 is a program module containing the functionality for laying out the placement and size of all of the controls contained within the dialog window 225. When the dialog window 225 is created at runtime of the software application 310, the autolayout module 330 determines the layout of the dialog window 225 in accordance with rules set up by the developer of the software application 310. Those rules may include, among other things, the size of a dialog window, including its width and height in a standard measuring system such as pixels. The rules may also include the size of all controls to be located within the borders of the dialog window 225. The rules will also include the relative positions of all of the controls to be located within the borders of the dialog window 225.

As will be appreciated by those skilled in the art, the autolayout module 330 and the dialog manager module 320 may be separate modules, as illustrated in FIG. 3. Alternatively, the autolayout module 330 and the dialog manager module 320 may be part of a single module, such as a DLL, containing other software code for performing other functionality, such as drawing and implementing tool bars, graphical shapes, and the like.

According to a preferred embodiment of the autolayout module 330, the rules governing layout of the dialog window 225 do not set specific locations of and distances between controls, but the rules instruct the autolayout module 330 on the relative locations of those controls. For example, the rules for a given dialog window may require that the Cancel button be placed in the lower right-hand corner of the dialog window 225. According to those rules, when the autolayout module 330 lays out the dialog window 225, it places the Cancel button in the lower right-hand corner. If the size of the dialog window is changed, the autolayout module 330 follows the rules set by the software application developer and maintains the Cancel button in the lower right-hand corner of the dialog window 225 regardless of the size of the dialog window 225. The mechanism of the autolayout module 330 is described in U.S. Pat. No. 5,886,694 to Breinberg et al., issued Mar. 23, 1999, and assigned to Microsoft Corporation of Redmond, Wash. U.S. Pat. No. 5,886,694 is incorporated herein by reference as if set out fully herein.

After a user has changed the size of the dialog window 225 during operation of the software application 310, the autolayout module 330, in accordance with the rules set by the program developer, places and sizes the controls required for the dialog window 225 within the newly sized dialog window. As the autolayout module 330 determines the positions and sizes of the controls in the dialog window, the autolayout module 330 calls each control to be moved or resized as necessary. For example, after the autolayout module 330 determines to move the Cancel button 244, the autolayout module 330 notifies the Cancel button 244 that it needs to change its state of size and/or position. Another example includes resizing a control containing the display of a picture. As a result of the call from the autolayout module 330, the code responsible for drawing the picture in the control may enhance the resolution of the picture relative to its new size.

In accordance with an exemplary embodiment, a minimum size is set for the dialog window 225 by the autolayout module 330, and the minimum size is stored by the dialog manager 320. If a user attempts to resize the dialog window to a size less than the minimum size, the dialog manager 320 prevents the user from so doing.

According to a preferred embodiment, the dialog manager 320 lays out the dialog window 225, including all controls contained therein, on a bitmap off the screen of the user's computer 20. Once the entire dialog window 225 is constructed as a bitmap, the dialog manager module 320 sends the bitmap of the resized dialog window 225 to the screen of the user's computer 20.

Figure 4:
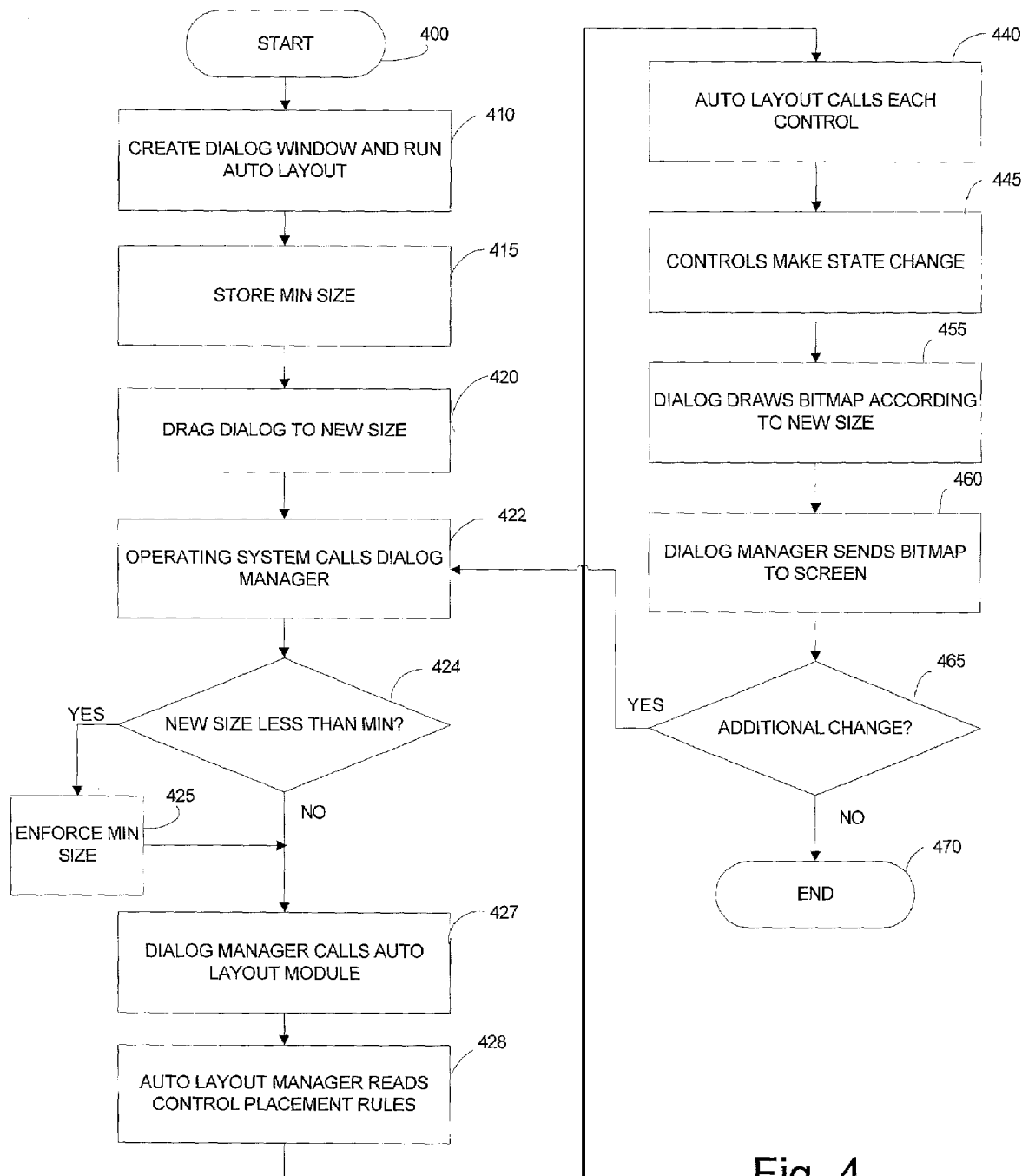
FIG. 4 illustrates an operational flow of the steps performed by the system and method of the present invention in dynamically resizing and laying out a dialog window.

It is advantageous to describe an exemplary embodiment of the present invention in terms of an exemplary operation of the present invention on the resizing of a dialog window 225. FIG. 4 illustrates an operational flow of the steps performed by the system and method of the present invention in dynamically resizing and laying out a dialog window during operation of a software application 310, such as a word processing application. For purposes of discussion of the operational flow illustrated in FIG. 4, a user opening an exemplary word processing software application 310 and making changes in the size of a File Open dialog window 225 is described. FIG. 4 is described with reference to components illustrated in FIGS. 1–3.

The method begins at step 400, and the user opens for use the software application 310, for example, a word processing application, and selects for opening a dialog window 225. According to the present example, the user of the software application 310 opens the dialog window 225 by selecting the Open button 220 under the File button 210, as illustrated in FIG. 2. As described herein, and in accordance with an exemplary embodiment, the File Open dialog window 225 is opened initially to the user in accordance with the preset rules defined by the developer of the software application 310.

At step 410, the dialog manager 320 creates the dialog window 225 and runs the autolayout module 330 on the dialog window 225 to determine the minimum size for the dialog window. At step 415, the minimum size for the dialog window 225 is stored for use during the ran-time of the dialog. According to an exemplary embodiment, when the dialog window is closed, the stored value of the minimum size of the dialog is discarded and must be recalculated the next time the dialog window is opened.

After the user opens the File Open dialog window 225, the user decides to resize the dialog window 225 to a different size, as illustrated in FIG. 2. At step 420, the user clicks on the resizing tab 241 and drags the File Open dialog window to a larger size, as illustrated in FIG. 2. It should be understood that if the user does not wish to resize the dialog window 225, the user may utilize the dialog window 225 in the size and layout created by the dialog manager module 320 and then dismiss the dialog window 225 after the user is finished with that dialog window.

At step 422, after the user drags the File Open dialog window 225 to a larger size, the operating system 300 of the user's computer 20 notifies the dialog manager module 320 that the File Open dialog window 225 is being resized. At step 424, the dialog manager module 320 determines whether the size selected by the user is less than the minimum size set by the developer of the software application 310. If the size selected by the user is not less than the minimum allowed size, the method proceeds along the "No" branch to step 427. If the size selected by the user for the File Open dialog window 225 is less than the minimum size set by the developer of the software application 310, the method follows the "Yes" branch to step 425, and the dialog manager module 320 enforces the minimum size and prevents the dialog window 225 from being redrawn in a size smaller than the minimum size set by the developer at step 410.

At step 427, the dialog manager module 320 calls the autolayout module 330 to request that the File Open dialog window 225 be drawn according to the new size selected by the user. At step 428, the autolayout module 330 reads the rules set by the developer of the software application 310 for the layout of the File Open dialog window 225. The method then proceeds to step 440.

At step 440, the autolayout module 330 calls (via the dialog manager 320) each control disposed within the dialog window 225 including the Open and Cancel buttons 244, 245 and the buttons 251, 252, 253 to inform those controls that they may be sized differently and/or moved to a different location within the File Open dialog window 225. At step 445, each control called by the autolayout module 330 makes a state change with regard to its size and its location within the File Open dialog window 225.

At step 455, the dialog manager module draws the File Open dialog window 225 onto a bitmap off the screen of the user's computer 20. According to an exemplary embodiment, for each control in the dialog, the following actions are accomplished as part of the steps of drawing the control (steps 445 and 455). First, the autolayout module makes a call to the dialog manager module 320 to report the control's new size and position. Second, the dialog manager module changes the state of the control. And, third, the dialog manager draws the control (in its changed state) in the offscreen bitmap. All three steps are run for any given control before moving on to the "next" control. At step 460, the dialog manager module 320, in concert with the operating system 300, sends the bitmap to the screen of the user's computer 20. Drawing the dialog window as a bitmap off screen is not a necessity, but according to an exemplary embodiment, it enhances performance by reducing the appearance of screen "flicker" sometimes detected if the controls are drawn one at a time directly on screen.

At step 465, a determination is made as to whether the user makes any additional changes to the size of the dialog window 225. If no additional size changes are made, the method follows the "No" branch and ends at step 470. If the user makes additional changes to the size of the dialog window 225, the method follows the "Yes" branch back to step 425, and the method proceeds as described above.

As described herein, a method and a system are provided for dynamically resizing dialogs while running a software application to which the dialogs belong. It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein. It is intended that this specification be considered as exemplary only where the true scope and the spirit of the invention are indicated by the following claims.

We claim:

1. A method of resizing a dialog window of a computer software application, the dialog window having at least one dialog window element disposed thereon, comprising:
    altering the size of the dialog window dynamically to a selected size during running of the computer software application;
    determining whether the selected size of the dialog window is less than a minimum size for the dialog window, the minimum size comprising a value established in the computer software application wherein the value is discarded upon closing the dialog window and the value is calculated upon opening the dialog window;
    if the selected size of the dialog window is less than the minimum size, then altering the size of the dialog window to the minimum size and preventing a user from manually shrinking the dialog window below the minimum size;
    notifying a dialog window control module that dialog window interface is being resized to the minimum size;
    notifying the dialog window element that it is to be repositioned on the dialog window according to a set of rules governing the position of the dialog window elements on the dialog window;
    repositioning the dialog window element according to the set of rules, wherein repositioning the dialog window element includes moving the dialog window element from a first position to a second position, wherein the second position is the same relative position on the dialog window after the dialog window has been resized, as the first position of the dialog window element prior to altering the size of the dialog window to the minimum size; and
    displaying the dialog window.

2. The method of claim 1, wherein displaying the dialog window, comprises:
    constructing a bitmap of the dialog window according the selected size;
    positioning the dialog window element on the bitmap according to the set of rules; and
    designating the bitmap for display.

3. The method of claim 1, wherein notifying the dialog window element that it is to be repositioned, comprises:
    altering the dialog window element in response to altering the size of the dialog window.

4. The method of claim 3, wherein altering the dialog window element, comprises:
    altering the size of the dialog window element.

5. The method of claim 1, wherein the dialog window is a dialog window for providing access to functionality of the computer software application.

6. The method of claim 1, wherein the dialog window element includes a plurality of controls disposed on the dialog window.

7. A method of resizing a dialog window of a computer software application, the dialog window having a plurality of controls disposed thereon, comprising:
running the computer software application;
altering the size of the dialog window dynamically by user action to a selected size while the computer software application is running;
determining whether the selected size of the dialog window is less than a minimum size for the dialog window, the minimum size comprising a value established in the computer software application wherein the value is discarded upon closing the dialog window and the value is calculated upon opening the dialog window;
if the selected size of the dialog window is less than the minimum size, then altering the size of the dialog window to the minimum size and preventing a user from manually shrinking the dialog window below the minimum size;
notifying a dialog window manager module that the dialog window is being resized to the minimum size;
notifying each of the plurality of controls that it is to be repositioned on the dialog window according to a set of rules governing the position of controls on the dialog window;
repositioning the plurality of controls according to the set of rules, wherein repositioning the plurality of controls includes moving the plurality of controls from a first position to a second position, wherein the second position is the same relative position on the dialog window after the dialog window has been resized, as the first position of the plurality of controls prior to altering the size of the dialog window to the minimum size; and
displaying the dialog window.

8. The method of claim 7, whereby the step of repositioning the plurality of controls according to the set of rules, further includes
specifying a plurality of frames, each frame representing a region within the dialog window, the frames forming a hierarchical tree of frames, the tree of frames including at least one parent frame having at least one associated child frame, wherein a region represented by each parent frame encloses a region represented by its associated child frame, each of the plurality of controls having an associated frame;
determining a minimum size of each child frame;
determining a minimum size of each parent frame based on the minimum sizes of its child frames;
determining a position for each parent frame;
determining a position of each child frame based on the position of its parent frame;
determining a size and position of each of the plurality of controls, based on the determined size and position of its associated frames; and
designating for display within the dialog window each of the plurality of controls according to its size and position.

9. The method of claim 7, whereby the step of displaying the dialog window, includes the steps of:
constructing a bitmap of the dialog window according the selected size;
positioning the plurality of controls on the bitmap according to the set of rules; and
designating the bitmap for display.

10. A computer readable medium having stored thereon computer-executable instructions which when executed by a computer resize a dialog window of a computer software application, the dialog window having at least one dialog window element disposed thereon by performing:
altering the size of the dialog window dynamically to a selected size during running of the computer software application;
determining whether the selected size of the dialog window is less than a minimum size for the dialog window, the minimum size comprising a value established in the computer software application wherein the value is discarded upon closing the dialog window and the value is calculated upon opening the dialog window;
if the selected size of the dialog window is less than the minimum size, then altering the size of the dialog window to the minimum size and preventing a user from manually shrinking the dialog window below the minimum size;
notifying a dialog window control module that the dialog window is being resized to the minimum size;
notifying the dialog window element that it is to be repositioned on the dialog window according to a set of rules governing the position of dialog window elements on the dialog window;
repositioning the dialog window element according to the set of rules, wherein repositioning the dialog window element includes moving the dialog window element from a first position to a second position, wherein the second position is the same relative position on the dialog window after the dialog window has been resized, as the first position of the dialog window element prior to altering the size of the dialog window to the minimum size; and
displaying the dialog window.

11. The medium of claim 10, wherein displaying the dialog window, comprises;
constructing a bitmap of the dialog window according the selected size;
positioning the dialog window element on the bitmap according to the set of rules; and
designating the bitmap for display.

12. The method of claim 10, wherein notifying the dialog window element that it is to be repositioned, comprises:
in response to notifying the dialog window element that it is to be repositioned, altering the dialog window element in response to altering the size of the dialog window.

13. A system for resizing a dialog window of a computer software application, the dialog window having a plurality of controls disposed thereon, comprising:
a computer operating system operative to run the computer software application;
a dialog manager module operative to alter the size of the dialog window to a selected size in response to user action while the computer software application is running;
determine whether the selected size of the dialog window is less than a minimum size for dialog window, the minimum size comprising a value established in the computer software application wherein the value is discarded upon closing the dialog window and the value is calculated upon opening the dialog window;
if the selected size of the dialog window is less than the minimum size, then alter the size of the dialog window to the minimum size and prevent a user from manually shrinking the dialog window below the minimum size;

the computer operating system further operative to notify a dialog window manager module that the dialog window is being resized to the minimum size;

the dialog manager module further operative to notify each of the plurality of controls that it is to be repositioned on the dialog window according to a set of rules governing the position of controls on the dialog window;

an autolayout module operative to communicate to the dialog manager module to reposition the plurality of controls according to the set of rules;

reposition the plurality of controls according to the set of rules, wherein repositioning the plurality of controls includes moving the plurality of controls from a first position to a second position, wherein the second position is the same relative position on the dialog window after the dialog window has been resized, as the first position of the plurality of controls prior to altering the size of the dialog window to the minimum size; and the operating system further operative to display the dialog window.

14. The system of claim 13, whereby the dialog manager module is further operative;

to construct a bitmap of the dialog window according the selected size;

to position the plurality of controls on the bitmap according to the repositioning of the plurality of controls performed by the auto layout module; and to designate the bitmap for display by the operating system.

* * * * *